J. T. IRWIN.
ELECTRODYNAMOMETER INSTRUMENT.
APPLICATION FILED NOV. 26, 1913.
1,224,171. Patented May 1, 1917.
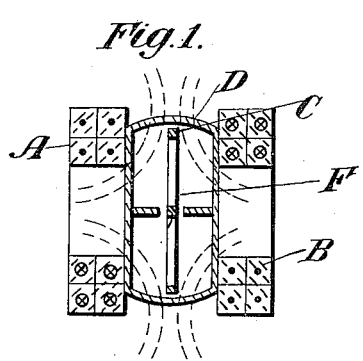
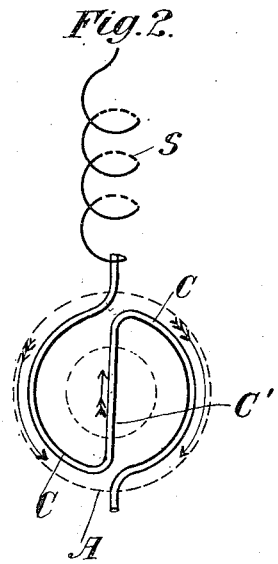
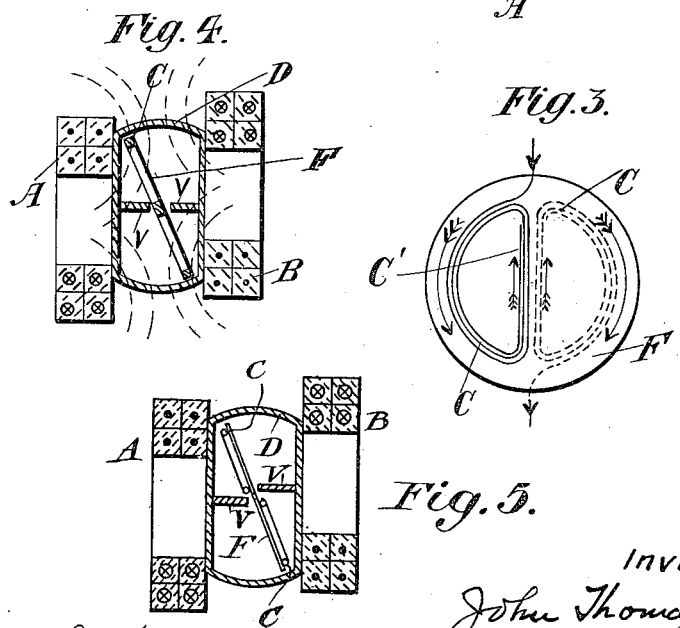
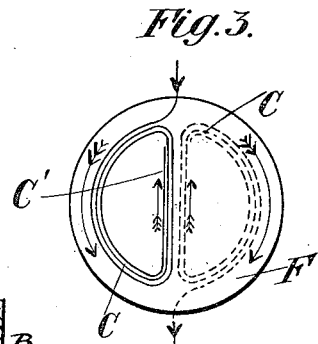
Attest
C. H. Wissmann
E. W. Smith
Inventor
John Thomas Irwin
By his atty.

UNITED STATES PATENT OFFICE.

JOHN THOMAS IRWIN, OF LONDON, ENGLAND.

ELECTRODYNAMOMETER INSTRUMENT.

1,224,171.  Specification of Letters Patent.  Patented May 1, 1917.

Application filed November 26, 1913. Serial No. 803,139.

*To all whom it may concern:*

Be it known that I, JOHN THOMAS IRWIN, a subject of the King of Great Britain and Ireland, residing at 16 Farquhar road, Wimbledon Park, London, England, have invented new and useful Improvements in and Relating to Electrodynamometer Instruments, of which the following is a specification.

My invention relates to improvements in electrodynamometer instruments and consists in the particular construction hereinafter set out to make them astatic, that is, to make them practically independent of external fields.

To accomplish this, I wind two similar coils on the same horizontal axis or on parallel horizontal axes but so connected in the electric circuit that the currents in these coils are flowing in opposite directions; and the flux therefore from one coil opposes the flux from the other. There will then be a resultant flux between the coils, and this will be radially out from or toward the axis. In this field I place a coil with its center on the axis of the two coils or between the two axes of said coils if they are not in line, with its plane vertical and free to rotate about an axis parallel to and between the two similar field coils. I wind this third coil so that there will be a torque about its axis due to the interaction of the flux from the two outside coils and the current in the third or movable coil. To effect this the moving coil is so wound that the current flows in opposite directions in the opposite halves of the coil, and in the same direction on portions of the coil arranged at the center or diameter. The coil is preferably wound substantially as in a figure of eight.

Of course each semi-circular half of the moving coil can be wound first and then connected in series so that the current flows in one direction on the outside of the coil and in the opposite direction at the center or axial portion.

The instrument will give a torque for any position proportional to the product of the current in the fixed coils and the current in the moving coil; it can therefore be connected up to measure the current in a circuit, if the fixed and moving coils are placed in series, or the power in a circuit, if the fixed coils have a current proportional to the main current and the moving coil has a current proportional to the pressure across the circuit.

When the coils are connected in series so as to measure the current in a circuit, it is an advantage to have a scale as uniform as possible and for this reason I sometimes arrange the two fixed coils so that their axes are not in the same straight line but displaced in a horizontal direction, but so that their planes are still parallel. I then arrange the moving coil between and relative to the fixed coils, so that at the zero position on the scale the rate of change of the mutual induction of the fixed and moving coils is greater than at the higher positions on the scale.

My invention is illustrated diagrammatically in the accompanying drawings in which Figure 1 is a horizontal central sectional view of an arrangement embodying my invention, Fig. 2 shows in elevation the moving coil with its control spring and one of the fixed coils is shown dotted, Fig. 3 is a view in elevation showing the moving coil wound in an alternative manner, Fig. 4 is a horizontal sectional view of an alternative arrangement of the instrument, and Fig. 5 is a sectional view similar to Fig. 4 with the movable coils and disk corresponding to Fig. 3.

Referring to Figs. 1 and 2, A and B are the two fixed coils and C is the moving coil. In Fig. 2 the moving coil is shown with its control spring S and with one of the fixed coils A shown dotted. The fixed circular coils A and B have the currents in them flowing in opposite directions so that they produce a field between them as shown by the dotted lines in Fig. 1. In this field I place the coil C having its outer coil portions arranged nearly circular in shape. The coil C may be of a single turn as shown in Fig. 2; or it may be of many turns as shown in Fig. 3, when it is mounted on two sides of a vane F. The connections are such that the current flows down on the outer portions of the coil C away from and on opposite sides of the axis and up at the central connecting portions as indicated by the arrows in Figs. 2 and 3; or the current may flow up at the outside of the coil and down at the center.

The coil CC indicated in Fig. 2 is represented as of a single coil more or less S-shaped, as the two curved parts CC are connected by the intermediate axial part C', and as the terminals of the curved parts CC of the coils almost close on the axial part C', the wire very nearly approximates a figure 8. In cases where there are a plurality of windings to give a multiple coil, as in Fig. 3, the winding is in all material respects a figure 8, as the plurality of windings C of one of the axial parts are connected with the plurality of windings C of the other of the coil parts through the axial portion whereby the current flows through all of the windings of the coils in succession and in the direction indicated by the arrows. It is manifest that exactly the same results will be secured as in Fig. 3, if with each complete coil, as shown in Fig. 2, there is a repetition of winding, the wire being carried axially to the starting point with each winding. In all of these cases the current passes peripherally in opposite directions in the curved portions of the coils and axially in the same direction at the straight or central portions of the coil.

The interaction of the field of the fixed coils A and B with the current in the moving coil C gives a torque about its axis, the direction of which is determined by the directions of the current in the moving coil and that in the fixed coils; and I measure this torque in the ordinary way by having it working against a spring or a bifilar suspension. The moving coil can be constructed with pivots or suspended by a fiber in any of the well known ways and the indications observed by means of a mirror or pointer.

In Fig. 4 I show the arrangement where the two coils A and B are not on one and the same axis but are displaced relative to one another. The moving coil is here shown in the zero position at an angle with the planes of the fixed coils. With this starting position of the moving coil the change of the mutual induction between the fixed and moving coils for a given angular movement is greater than it is for the larger angular displacements, so that when the torque is small the moving coil is in the most favorable position and this gives a more uniform scale movement.

In Fig. 5, I have shown the general arrangement of parts indicated in Fig. 4, with the fixed field coils A and B slightly displaced axially and with the dampener case D substantially as shown in Figs. 1 and 4, but with the pivoted disk and coil member of the construction shown in Fig. 3, that is to say, having part of the coil C upon one side of the disk and part on the other.

The moving coils shown in Figs. 2 and 3 will give no resultant torque due to an external uniform field such as the earth's field, since the torques on opposite sides of the coils are equal and opposite; and said coils will give very little torque where the external field is not uniform, except it be changing very rapidly from point to point, since the two sides of the coil are relatively close together.

I sometimes mount a mica vane or one made of some similar non-conducting material on the moving coil as at F in Fig. 3 and arrange the coil and vane to rotate in a damping chamber between the fixed coils. This chamber I make of a suitable non-conducting material such as ebonite or of a high resistance material such as manganin so as to be unaffected by the changing fluxes when using alternating currents.

This chamber is shown at D in Figs. 1 and 4 and VV are fixed vanes attached to the sides of the damping chamber to make the air resistance greater. It will be observed that the dampening chamber D is divided into substantially two compartments, in each of which one-half of the coil structure CC is arranged to swing about the axis as a center; and moreover, it will be observed that the dampening chamber has its periphery curved in both directions so that the perimeter of the coils or dampener disk to which the coils are attached swings close to the inner surface of the dampening chamber (Figs. 1 and 4), and consequently there is a resistance offered to the swinging of the dampener vane F and the coils, due to the fact that the air on opposite sides is more or less confined and must be displaced during the swinging of the coils C and dampener vane F.

What I claim as my invention is:—

1. In an electrodynamometer instrument, the combination of two substantially circular coils in parallel planes through which currents are adapted to flow in opposite directions to provide opposing fields, a dampening chamber arranged wholly between the parallel field producing coils and having inclosing walls formed of non-magnetic material, a circular dampening vane pivoted within the dampening chamber and adapted to freely oscillate therein, and a third coil of flat shape secured to and movable with the dampening vane and comprising two curved outer portions and a straight axial portion said third coil arranged to oscillate wholly within the dampening chamber and normally in general parallel association with respect to the two circular coils and through which third coil the current flows in one direction axially and in opposite direction in the curved portions of the coil.

2. In an electrodynamometer instrument, the combination of two substantially normally fixed circular coils in parallel planes through which currents are adapted to flow in opposite directions to provide opposing fields, said coils separated a distance less than the diameters of the coils, with a third coil pivoted between the two circular coils and formed of curved outer and straight axial portions in disk form and arranged in the opposing fields and through which coil the current flows in one direction axially and in opposite directions in the curved portions of the coil, a circular vane secured to and moving with the third coil, said vane and coil of a diameter greater than the distance between the fixed coils and a dampening chamber arranged between the two first mentioned circular coils and having inclosing walls surrounding the third coil and its dampener vane, said dampening chamber having its peripheral wall curved in both directions and divided into two chambers by transverse fixed vanes in axial alinement with the axis of the third coil and also in general alinement with the axes of the fixed coils.

3. In an electrodynamometer instrument, relatively fixed coils for producing a suitable uniform circular magnetic field, combined with a pivoted coil arranged in the magnetic field and consisting of a non-magnetic disk having attached thereto electric conductors comprising two curved portions and an intermediate axial portion connected at its opposite ends with the opposite ends of the curved portions whereby all three portions are connected in series and the current flows in opposite directions in the curved portions relatively to each other and to the current flowing in the axial portion, whereby the axial portion is non-effective and the curved portions operate to rotate the coil as a whole and with it the disk, one-half of said curved and axial coil portions arranged upon one side of the disk and the other half upon the other side of the disk.

4. In an electrodynamometer instrument, two fixed coils the fluxes of which are opposed when a current flows in them, said coils arranged in parallel relation at a distance apart, combined with an intermediate movable coil in general parallel relation to the fixed coils and wholly in the space between them and pivoted to rotate under the influence of the magnetic field of the fixed coils, said pivoted coil being composed of three parts arranged in substantially a common plane, one of said parts comprising semi-circular windings at one side of the axis, another of said parts comprising semi-circular windings at the opposite side of the axis, and the third portion comprising a plurality of straight portions axially arranged, and all of said portions connected in series, the construction being such that the axial portions form connecting circuits between the semi-circular portions but are uninfluenced by the magnetic field to produce a torque in the intermediate movable coil as a whole, and a disk of non-magnetic material secured to the movable coil and moving with it and said disk and coil of greater diameter than the distance between the fixed coils.

5. In an electrodynamometer instrument, the combination of two fixed coils in parallel planes for producing a magnetic field between them, with a movable non-magnetic disk pivoted between the fixed coils on an axis parallel thereto and having a diameter greater than the distance between the fixed coils and a movable coil fixed to and movable with the disk and having two portions extending from opposite sides of the axis and upon opposite sides of the disk through which the current flows in opposite directions and an axial portion adjacent to the axis and common to each of the first mentioned coil portions whereby it forms an electric circuit between them but is substantially uninfluenced by the magnetic flux of the fixed coils.

6. In an electrodynamometer instrument, the combination of two fixed coils in parallel planes for producing a magnetic field between them, with a movable non-magnetic disk pivoted between the fixed coils on an axis parallel thereto and having a diameter greater than the distance between the fixed coils and a movable coil fixed to and movable with the disk and having two portions extending from opposite sides of the axis and upon opposite sides of the disk through which the current flows in opposite directions and an axial portion adjacent to the axis and common to each of the first mentioned coil portions whereby it forms an electric circuit between them but is substantially uninfluenced by the magnetic flux of the fixed coils, and dampening means arranged wholly in the space between the opposing faces of the fixed coils and inclosing the movable disk and its coil.

JOHN THOMAS IRWIN.

Witnesses:
 TRACY LAY,
 O. J. WORTH.